United States Patent
Copeland

[15] 3,669,425
[45] June 13, 1972

[54] WATER COOLING TOWER

[72] Inventor: John H. Copeland, Borough of Ringwood, N.J.

[73] Assignee: P. T. & T. Industries, Inc., Franklin Lakes, N.J.

[22] Filed: July 30, 1970

[21] Appl. No.: 59,559

[52] U.S. Cl. ..........................261/79 A, 261/109, 261/110, 261/112, 55/237, 55/238, 55/241, 55/259, 55/520
[51] Int. Cl. ..................................B01d 45/00, B01f 3/04
[58] Field of Search..................55/185, 236, 237, 238, 241, 55/257, 259, 520; 261/79 A, 109, 110, 112

[56] References Cited

UNITED STATES PATENTS

| | | | |
|---|---|---|---|
| 891,474 | 6/1908 | Gressly | 261/79 A |
| 2,317,951 | 4/1943 | Burk | 261/112 |
| 2,470,652 | 5/1949 | Scofield | 261/94 |
| 2,681,269 | 6/1954 | Bergstrom | 261/112 |
| 2,809,818 | 10/1957 | Munters | 261/112 |
| 2,404,789 | 7/1946 | Burk et al. | 261/112 |
| 3,500,615 | 3/1970 | Meek | 261/112 |
| 3,076,554 | 2/1963 | Bub | 55/520 |
| 2,322,548 | 6/1943 | Sigmund | 55/520 |
| 3,302,372 | 2/1967 | Hynson et al. | 55/257 |
| 3,348,364 | 10/1967 | Henby | 261/79 A |

Primary Examiner—Tim R. Miles
Assistant Examiner—Steven H. Markowitz
Attorney—Samuelson & Jacob

[57] ABSTRACT

A water cooling tower is shown which comprises a blower opening into the bottom of the tower for introducing or blowing air into the tower. A continuously walled wet decking arranged in a spiral mounted above the air inlet port and having a large number of regularly spaced projections arranged in an inclined checkerboard or step like pattern to control the counterflowing air and water in the tower. A spray tree for introducing water into the vessel is mounted above the wet decking and a mist eliminator mounted above the spray tree. The mist eliminator is also constructed in the form of a continuously spirally wound vertical wall with adjacent surfaces of the eliminator wall being separated by a multiplicity of step like baffles.

4 Claims, 6 Drawing Figures

INVENTOR
JOHN H. COPELAND
BY
ATTORNEY 3,669,425

WATER COOLING TOWER

BACKGROUND OF THE INVENTION

This invention relates to apparatus for cooling water by evaporation of a small portion of the water. More particularly, this invention relates to apparatus of the sort known as cooling towers for evaporatively cooling water by contacting the water with a draft of air.

Broadly, the cooling tower is a chamber in which ambient air flows through a spray of entering hot water. The temperature of the water is normally reduced in part by heat transfer to the air, and to a greater degree by the evaporation of a portion of the water. Ambient air enters at local condition of temperature and humidity and emerges at a higher wet bulb temperature and usually saturated. It is commonly possible to cool the water to below the dry bulb temperature of the ambient air. Structurally, a cooling tower consists of a shell or housing open at the top and arranged so that heated water falls from the top in thin curtains into a reservoir at the base. Air enters the bottom and is forced out at the top by natural draft or by a power driven fan. The interior of the tower is so arranged so that a relatively large water surface is exposed to the air. This surface is produced by water dripping or splashing downward through a filling sometimes of water resistant wood or sheet metal. The cooling tower is generally either of the natural draft or of the mechanical draft type. The latter is divided into either a forced draft type in which a fan at the base blows air upwardly through the tower or induced air type where a fan at the top draws air from the tower. Mechanical draft towers possess significant advantages including freedom of location, smaller size and less make up water requirement. However, they require more in equipment maintenance and operating costs. Maintenance and operating costs, as well as initial cost, can be reduced by using a more efficient cooling tower.

Accordingly, it is an object of the present invention to provide apparatus for effectively cooling water with air.

Another object of this invention is to provide a novel structure for obtaining a greater water surface in contact with the air.

Still another object of this invention is to provide a novel cooling tower structure resulting in a helical counterflow path of air and water.

Yet another object of this invention is to provide a cooling tower embodying a combination of several novel structures to provide a more effective contact of air with water.

SUMMARY OF THE INVENTION

Accordingly, I have invented an improved water cooling tower. The tower comprises a vessel having an open top and a port in a sidewall of the vessel a distance above the bottom of the vessel, thereby providing a water reservoir. Air supply means preferably a fan or blower is communicatingly connected to the vessel port which is itself preferably offset to introduce the air tangentially. A water supply means is mounted in the upper portion of the vessel and a vertical wall arranged on a continuous spiral mounted below the water supply means and above the port, with the adjacent walls of the spiral being spaced from each other. A conduit is connected to the bottom of the vessel to withdraw cooled water from the vessel. The vertical spiral wall is preferably formed with a multiplicity of shaped projections arranged in a checkerboard pattern.

Other objects and advantages of the apparatus according to this invention will become apparent from the brief description of the drawings and preferred embodiments which follow.

BRIEF DESCRIPTION OF PREFERRED EMBODIMENT

Figure 1:
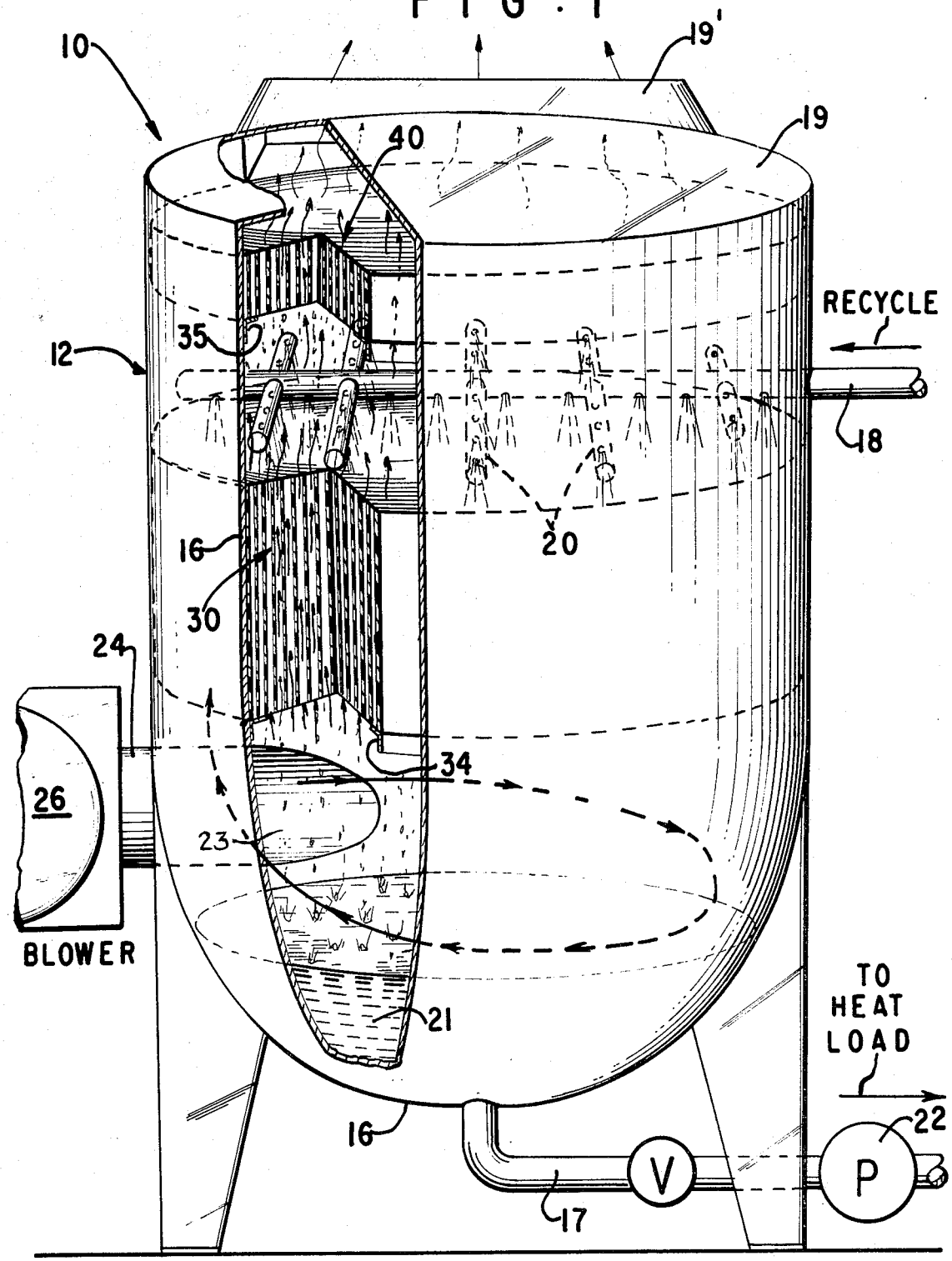
FIG. 1 is a perspective representation of the water cooling tower according to this invention.

Referring now to FIG. 1 of the drawings, a water cooling tower 10 according to my invention is shown having a cylindrical vessel 12 formed from a sidewall 14 and a hemispherical bottom 16.

Attached to the hemispherical bottom is a cooled water withdrawal conduit having appropriate valving and a pump 22 for pumping the cooled water to the heat load, not shown. Opening into the side of the vessel is an air introduction port 23 which is tangentially located and offset towards the side of vessel and capable of introducing the air along the path shown in the drawings as a dash line and capable of causing the air to be introduced in a swirling pattern.

Air duct 24 is attached to the vessel at port 23 and connected at its other end to a blower 26 which blower acts to propel ambient air into the tower.

Another variation of this particular structure would rotate the direction so that air is drawn out of the vessel through duct 24, making it possible to operate the cooling tower as a parallel flow if desired.

Above the air port 23, a vertical walled wet decking 30 made according to the principles of my invention as will be described hereinafter, is mounted and supported in the vessel by angles or struts 34.

Also connected to the vessel 10 and passing through the cylindrical vessel sidewall 14 is a water pipe 18 which is horizontally supported by the sidewall and extends along the horizontal plane of the vessel. A number of spray trees 20 are connected at right angles to the water pipe 18, each one of the trees extend outwardly towards the sides of the vessel and have a large number of small holes acting as nozzles for spraying the water into the vessel above the wet decking.

Pipe 18 recycles water back from the heat load after it has picked up heat from the heat load such as: air conditioning, power generating plants, etc.

The vessel may, if desired, have a top cover such as top 19 which may serve to keep contaminates such as leaves and so forth from falling in (as pictured in the drawing). Appropriate means for allowing air to exit with a minimum of resistance is provided by vent 19' which is connected at the top of the vessel.

Mounted a short distance below the top of the vessel and below the level of the vent 19' is a mist eliminator 40 which is a baffle device which acts to remove the water carryover from the exiting air stream and serves to conserve water.

Figure 2:
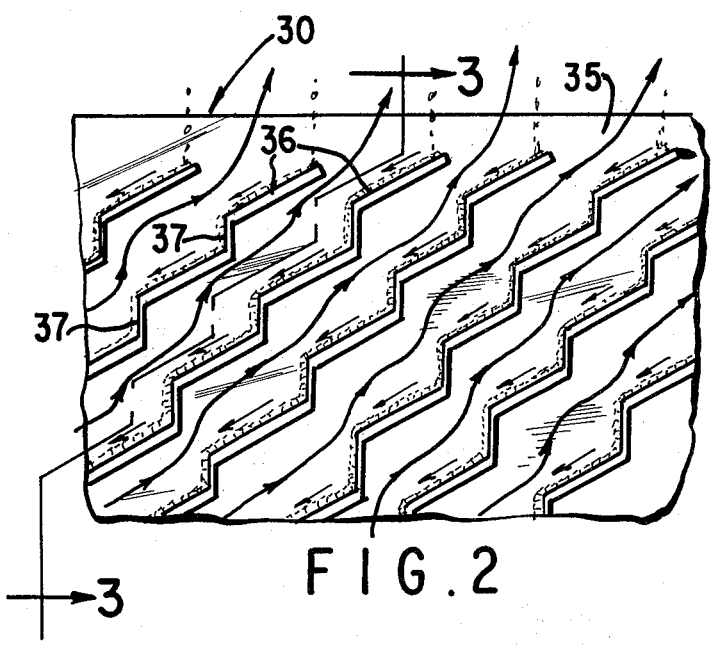
FIG. 2 is a front view of the section of the vertical wet decking showing the projections for controlling flow.
Figure 3:
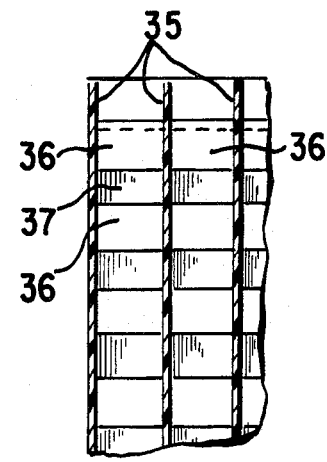
FIG. 3 is a view taken along section 3—3 of FIG. 2.
Figure 4:
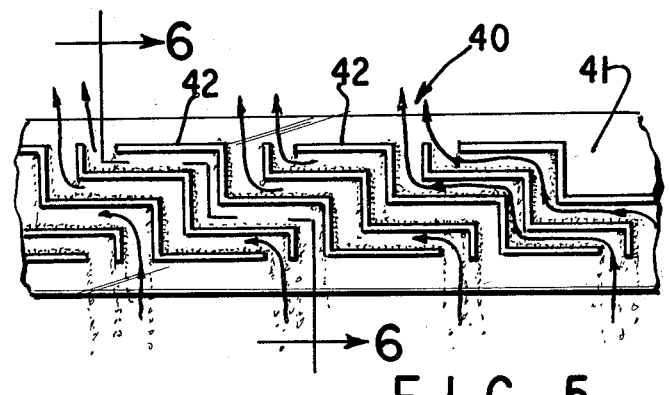
FIG. 4 is a perspective view of a portion of the wet decking shown in FIG. 2.
Figure 5:
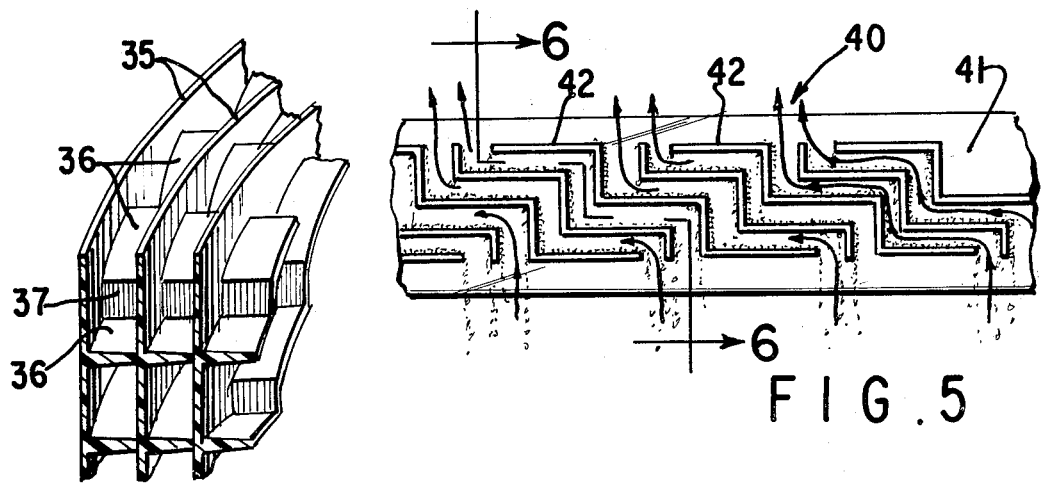
FIG. 5 is a cutaway side view of the mist eliminator.
Figure 6:
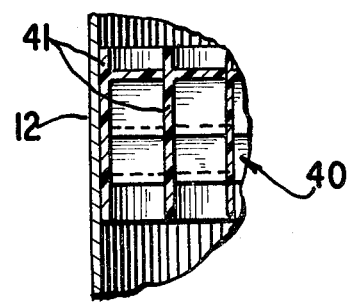
FIG. 6 is a view taken along 6—6 of FIG. 5.

Referring now to FIG. 2, 3 and 4, various views of the wet decking 30 of my invention are shown. It is constructed of a continuous vertical wall 35 arranged as a spiral, each adjacent portion of the wet decking walls 35 being spaced apart from each other by a large number of projections arranged in a regular pattern and formed of an inclined rib 36 extending and mounted to one wall and extending to the opposite edge of the inclined projection ribs in a step like or checkerboard pattern.

Each one of these projections 36 is connected at each one of their top and bottom edges to a vertical web 37.

Referring now to the mist eliminator, it is also constructed of a continuous wall of somewhat smaller height of wall 35 and wound spirally; each adjacent portion of eliminator wall being separated from the back of the opposite wall by a large number of regularly placed baffles 42.

Baffles 42 act to change the path of the air passing through the eliminators so that water particles are separated from the exiting air. The use of a spiral continuous wall together with the baffles having a number of bends therein extends the passages of air through the eliminator so that an increased amount of deflections or breaking of the exiting air path can be obtained without loss of available cross sectional flow area.

In operation, air is introduced into the vessel through port 23 and recycled heated water from the heat load is conveyed to and into the vessel through pipe 18 and distributed by the spray tree 20 as a water spray downwardly into the vessel.

The wet decking 30 acts to guide the downwardly flowing water over the decking projections along an extended inclined path between the spirally arranged decking walls. At the same time, upwardly flowing air is similarly affected by the inclined arrangement of the projections and webs to obtain the counterflow mixing of the air and water. The amount of time that the water and air are in contact with each other in the volume enclosed by the wet decking is greatly increased in that the inclined spiral flow extends the fluid flow path within the decking. In my invention, it may be considered that the air and water are forced to travel the same vertical distance as in a conventional counterflow tower, and additionally, travels the horizontal distance as would be obtained in a conventional cross flow tower except that the effective horizontal distance is increased by the curved path induced by the spirally wound vertical walls.

If the wet deck area is considered as a single deck or formed sheet unrolled to form a single deck, and assuming equal distribution of air and water so that the average path of fluids follows the median circumference of a spiral, it may well be seen that with a height to diameter ratio that allows only one half pass, horizontal distance alone is in excess of a straight path of the same length as the diameter of the tube. This effect is multiplied as height is increased in relation to diameter.

It should, of course, be realized that this same spirally wound wet decking 30 can be used in a water cooling tower in which the air and water are introduced so as to obtain parallel flow. The air exiting the top of the wet decking passes through the spray and into the bottom of the mist eliminator 40. Any carried over water particles are disengaged from the exiting air as the path of the air flow is deflected by baffles 42. Disengaged water particles spray down into the vessel from the eliminator by gravity.

Finally, the cooled water after passing through the wet decking is collected in the bottom of the vessel enclosed by the hemispherical wall. Such a hemispherical shape provides the advantages of a lower required amount of cooling water due to the lesser storage requirement, and additionally, the structural support needed for the smaller amount of water is less. Also, air can be induced out of the top of the cooling tower rather than blown into the bottom.

Having fully described my invention and wishing to cover those modifications and variations which would be apparent to those schooled in the art without departing from either the scope or spirit of the invention, the following claims are appended to this application.

I claim:

1. A water cooling tower comprising:
   a vertically mounted, cylindrically shaped vessel having at least one port in a sidewall thereof located a spaced distance above the bottom thereof;
   air supply means communicatingly connected to said vessel port for introducing air into said vessel;
   water supply means mounted in an upper portion of said vessel for distributing water into said vessel;
   a continuous spiral, vertical wall with the adjacent surfaces thereof spaced from each other, mounted in said vessel above said port and below said water supply means for causing the water and air to follow a counterflow path;
   the continuous vertical wall comprising a multiplicity of projections arranged in a checkerboard pattern on said wall, said projections extending substantially the spaced distance between adjacent surfaces of said continuous spiral, vertical wall whereby fluids are caused to flow in a helical path; and
   conduit means connected to said vessel at the bottom thereof for withdrawing cooled water from the vessel.

2. The invention of claim 1 wherein said air supply means is a tangentially mounted air source whereby air is introduced into said vessel adjacent the vessel sidewalls.

3. The invention of claim 2 wherein the vessel bottom is hemispherical in shape.

4. The invention of claim 1 wherein the vessel bottom is hemispherical in shape.

* * * * *